US012260359B2

(12) United States Patent
Dhingra

(10) Patent No.: US 12,260,359 B2
(45) Date of Patent: Mar. 25, 2025

(54) METHOD FOR DETERMINING COGNITIVE ATTRIBUTES FROM AN ADJUSTED FORECAST TO AUTOMATICALLY RECOMMEND IMPROVED ADJUSTED FORECAST

(71) Applicant: SAMYA.AI INC., Northbrook, IL (US)

(72) Inventor: Deepinder Dhingra, Bangalore (IN)

(73) Assignee: SAMYA.AI INC., Northbrook, IL (US)

( * ) Notice: Subject to any disclaimer, the term of this patent is extended or adjusted under 35 U.S.C. 154(b) by 85 days.

(21) Appl. No.: 17/280,905

(22) PCT Filed: Mar. 12, 2021

(86) PCT No.: PCT/IN2021/050250
§ 371 (c)(1),
(2) Date: Mar. 28, 2021

(87) PCT Pub. No.: WO2021/186466
PCT Pub. Date: Sep. 23, 2021

(65) Prior Publication Data
US 2023/0107730 A1    Apr. 6, 2023

(30) Foreign Application Priority Data

Mar. 15, 2020    (IN) .............................. 202041011086

(51) Int. Cl.
*G06Q 10/0637*    (2023.01)
(52) U.S. Cl.
CPC .............................. *G06Q 10/0637* (2013.01)
(58) Field of Classification Search
None
See application file for complete search history.

(56) References Cited

U.S. PATENT DOCUMENTS 7,584,116 B2    9/2009  Kakouros et al.
8,285,582 B2    10/2012 Bateni et al.
(Continued)

FOREIGN PATENT DOCUMENTS

WO    WO-2015084789 A1 *  6/2015  ........... G06Q 10/087

OTHER PUBLICATIONS

Andrey Davydenko, Robert Fildes, "Measuring forecasting accuracy: The case of judgmental adjustments to SKU-level demand forecasts," International Journal of Forecasting, vol. 29, Issue 3, 2013, pp. 510-522 (Year: 2013).*

*Primary Examiner* — Amanda Gurski
(74) *Attorney, Agent, or Firm* — Wiley Rein LLP

(57) ABSTRACT

A method for determining cognitive attributes from adjusted forecast to automatically recommend changes in adjusted forecast is provided. The method includes (i) receiving for a bias management service, action recommendation to mitigate or leverage from parameter forecast, which is a forecast of future values of a parameter associated with a factor group, tracking a modification in parameter forecast based on adjustment made by cognitive system in parameter forecast, classifying adjusted forecast as negative or positive cognitive system bias based on a deviation of the adjusted forecast from actual value to determine bias of the cognitive system, determining factors that associate with bias of the cognitive system, generating a skill score of cognitive system based on factor group of the bias management service using a machine learning engine and generating a recommendation to change a value of adjusted forecast based on cognitive attributes and skill score of cognitive system.

10 Claims, 9 Drawing Sheets

(56) References Cited

U.S. PATENT DOCUMENTS

| | | | |
|---|---|---|---|
| 2004/0088211 A1* | 5/2004 | Kakouros | G06Q 10/06395 |
| | | | 705/7.41 |
| 2010/0153179 A1* | 6/2010 | Bateni | G06Q 30/02 |
| | | | 705/7.31 |
| 2013/0262177 A1 | 10/2013 | Dogan et al. | |
| 2018/0068259 A1* | 3/2018 | Surendra | G06Q 10/087 |
| 2020/0302455 A1* | 9/2020 | Arroyo | G06N 20/00 |
| 2020/0380541 A1* | 12/2020 | Laing | G06Q 30/0244 |

* cited by examiner

```
┌─────────────────────────────────────────────────┐
│ GENERATING AN ACTION RECOMMENDATION THAT RECOMMENDS │
│ MITIGATING OR LEVERAGING FROM A PARAMETER FORECAST TO │
│ A CLIENT DEVICE (116) ASSOCIATED WITH A BIAS MANAGEMENT │
│ SERVICE, WHEREIN THE PARAMETER FORECAST IS A FORECAST │
│ OF FUTURE VALUES OF A PARAMETER ASSOCIATED WITH A │
│ FACTOR GROUP OF THE BIAS MANAGEMENT SERVICE │
│ 702 │
└─────────────────────────────────────────────────┘
                        ▼
┌─────────────────────────────────────────────────┐
│ OBTAINING AN ADJUSTED FORECAST FROM THE CLIENT DEVICE │
│ (116), WHEREIN THE ADJUSTED FORECAST IS A MODIFICATION IN │
│ THE PARAMETER FORECAST BASED ON AN ADJUSTMENT MADE BY │
│ A COGNITIVE SYSTEM IN THE PARAMETER FORECAST │
│ 704 │
└─────────────────────────────────────────────────┘
                        ▼
┌─────────────────────────────────────────────────┐
│ CLASSIFYING THE ADJUSTED FORECAST AS A NEGATIVE │
│ FORECAST BIAS OR A POSITIVE FORECAST BIAS BASED ON A │
│ DEVIATION OF THE ADJUSTED FORECAST FROM AN ACTUAL │
│ VALUE OF THE PARAMETER ASSOCIATED WITH FORECAST │
│ 706 │
└─────────────────────────────────────────────────┘
                        ▼
┌─────────────────────────────────────────────────┐
│ AUTOMATICALLY DETERMINING A COGNITIVE ATTRIBUTE OF THE │
│ COGNITIVE SYSTEM BY GENERATING A SYSTEMATIC PATTERN OF │
│ THE DEVIATION OF THE ADJUSTED FORECAST FROM AN ACTUAL │
│ VALUE OF THE PARAMETER ASSOCIATED WITH THE PARAMETER │
│ FORECAST │
│ 708 │
└─────────────────────────────────────────────────┘
                        ▼
┌─────────────────────────────────────────────────┐
│ DETERMINING A SET OF FACTORS THAT ARE ASSOCIATED WITH │
│ THE NEGATIVE FORECAST BIAS OR THE POSITIVE FORECAST BIAS, │
│ WHEREIN SAID SET OF FACTORS IS A COMBINATION OF FACTORS │
│ OF AN EXTERNAL FACTOR GROUP AND A PLURALITY OF INTERNAL │
│ FACTOR GROUPS │
│ 710 │
└─────────────────────────────────────────────────┘
                        ▼
┌─────────────────────────────────────────────────┐
│ GENERATING A SKILL SCORE OF THE COGNITIVE SYSTEM THAT │
│ CORRESPONDS TO A SKILL FACTOR GROUP USING A MACHINE │
│ LEARNING ENGINE, WHEREIN THE SKILL FACTOR GROUP IS A │
│ COMBINATION OF AN EXTERNAL FACTOR GROUP AND A │
│ PLURALITY OF INTERNAL FACTOR GROUPS │
│ 712 │
└─────────────────────────────────────────────────┘
                        ▼
                       (A)
```

FIG. 7A

METHOD FOR DETERMINING COGNITIVE ATTRIBUTES FROM AN ADJUSTED FORECAST TO AUTOMATICALLY RECOMMEND IMPROVED ADJUSTED FORECAST

BACKGROUND

Technical Field

The embodiments herein generally relate to detecting cognitive attributes of a cognitive system, and more particularly to a method for determining cognitive attributes from an adjusted forecast to automatically recommend change in the adjusted forecast.

Description of the Related Art

Planning and forecasting are key activities in most of the enterprises and organizations. Forecast is a process of predicting or estimating a future value of a given quantity of variable to help an organization to plan its inputs resources and outputs. The organizations employ different mechanisms to generate different types of forecasts and plans which may include demand forecasts and plans, inventory plans, production plans, etc.

Forecasting is a complex process for organizations due to the sheer scale of data sources, number of combinations of different metrics and computational ability required to generate the forecasts. Market conditions also keep changing and results in increased complexity. Maintaining forecast accuracy and planning accuracy is a major focus for organizations. Traditionally, forecasts may be created using algorithms, usually a set of time series statistical algorithms, on past historical data along with other internal and external factors. Forecasts can also be created by human beings based on their expertise, experience and assessment of latest trends and future conditions.

Existing approaches use specific systems like demand planning software, Enterprise Resource Planning (ERP) software and specialized forecasting software to generate forecasts and combine the algorithmic expertise that comes out of such systems with human judgment from a cognitive system. The cognitive system may take inputs from sales department, marketing department, or marketing promotions department to adjust the base forecast from such systems for future time periods. The manual adjustment is often called 'planner overrides' or 'adjusted forecast' and represents the human judgement part of the forecasting. This enables to get better forecast results out of mathematical and human intelligence.

Although traditional systems combine the best of human intelligence and algorithmic expertise, there is a degree of subjectivity included in each planner override. This subjectivity on the part of cognitive systems may, in some cases, be impacted by the planners' conscious and unconscious biases. Since the planner overrides performed by the cognitive system are prone to biases. Hence, the results obtained from combining mathematical and human intelligence are bound to have forecast errors. Different cognitive systems have different skills of judgment for forecasting and some cognitive systems will be better than others in some factor groups of forecasts. This leads to several problems for the organization including lost sales, excess inventory, out of stocks, missed sales targets, missed growth opportunities, etc.

Accordingly, in the view of the foregoing, there remains a need of a method for determining cognitive attributes from an adjusted forecast to automatically recommend changes in the adjusted forecast.

SUMMARY

In the view of the foregoing, an embodiment herein provides a method for determining cognitive attributes from an adjusted forecast to automatically recommend change to the adjusted forecast. The method includes the steps of (i) generating an action recommendation that recommends mitigating or leveraging from a parameter forecast to a client device (116) associated with a bias management service, wherein the parameter forecast is a forecast of future values of a parameter associated with a factor group of the bias management service, (ii) obtaining an adjusted forecast from the client device (116), wherein the adjusted forecast is a modification in the parameter forecast based on an adjustment made by a cognitive system in the parameter forecast, (iii) classifying the adjusted forecast as a negative forecast bias or a positive forecast bias based on a deviation of the adjusted forecast from an actual value of the parameter associated with forecast, characterized in that, (iv) automatically determining a cognitive attribute of the cognitive system by generating a systematic pattern of the deviation of the adjusted forecast from an actual value of the parameter associated with the parameter forecast, (v) determining a set of factors that are associated with the negative forecast bias or the positive forecast bias, wherein said set of factors is a combination of factors of an external factor group and a plurality of internal factor groups, characterized in that, (vi) generating a skill score of the cognitive system that corresponds to a skill factor group using a machine learning engine, wherein the skill factor group is a combination of an external factor group and a plurality of internal factor groups, and, (vii) generating a recommendation of improved adjusted forecast based on the cognitive attribute of the cognitive system and skill score of the cognitive system, wherein the improved adjusted forecast comprises an updated value of the adjusted forecast.

In an embodiment the plurality of internal factor group comprises a first factor group which includes at least one of a location, a store, a product, a price-pack, a placement of product, a placement, a range, a visibility, a coverage, a frequency, a distribution reach, a channel, an event type or an inventive, a second factor group which includes at least one of a channel, a location of a promotion activity, a product for promotion, a price-pack, a time period (calendar) for a promotion activity, a promotion type, a price for a promotion activity, a discount for a promotion activity or a creative for a promotion activity; and, a third factor group which includes at least one of a location of inventory, a store of inventory, a type of inventory, a source location of inventory, a transfer of inventory, a new quantity for the inventory, a safety stock of inventory for a product, on hand levels of inventory or a reorder quantity of inventory, an allocation quantity of inventory.

In an embodiment, the plurality of internal factor groups comprises (a) a first factor group that comprises at least one of a location of consumer, a retail store, a product, a price-pack of product, a placement of product, a range, a visibility, a coverage, a frequency, a distribution reach, a channel, an event type or an inventive, (b) a second factor group that comprises at least one of a promotion channel, a location of a promotion activity, a product for promotion, a time period (calendar) for a promotion activity, a promotion type, a price for a promotion activity, a discount for a promotion activity or a creative for a promotion activity, and (c) a third factor group that comprises at least one of a location of inventory, a store of inventory, a type of inventory, a source location of inventory, a transfer of inventory, a new quantity for the inventory, a safety stock of inventory for a product, on hand levels of inventory or a reorder quantity of inventory, an allocation quantity of inventory.

In an embodiment, positive forecast bias happens when forecast accuracy of the adjusted forecast is increased from the parameter forecast and negative forecast bias happens when the forecast accuracy of the adjusted forecast is decreased from the parameter forecast.

In an embodiment, the method includes segregating one or more cognitive systems based on a combination of at least one of the skill score of the cognitive system and the at least one bias of the cognitive system.

In an embodiment, the method includes predicting a skill score of different cognitive systems in terms of a frequency of negative forecast bias and positive forecast bias.

In an embodiment, the method includes predicting a future adjusted forecast based on the skill score and the bias of the cognitive system in the factor group.

In an embodiment, the method of determining the at least one bias of the cognitive system includes a tracking signal that detects trends in the forecast adjustment of the cognitive system and identifying at least one human attribute of the cognitive system, wherein the at least one attribute includes age, gender or a location of the cognitive system.

In an embodiment, the parameter forecast is done at different levels, wherein the levels include product level, a location level, a stock keeping unit level.

In an embodiment, a system of determining cognitive attributes from an adjusted forecast to automatically recommend change to the adjusted forecast, the system comprising (i) a client device associated with a bias management service that receives an action recommendation that recommends mitigating or leveraging from a parameter forecast, wherein the parameter forecast is a forecast of future values of a parameter associated with a factor group of the bias management service and records an adjusted forecast, wherein the adjusted forecast is a modification in the parameter forecast based on an adjustment made by a cognitive system in the parameter forecast (ii) a bias management server comprising (a) a bias discovery and modelling module that classifies the adjusted forecast as a negative forecast bias or a positive forecast bias based on a deviation of the adjusted forecast from an actual value of the parameter associated with forecast (b) a bias quantification module 304 that automatically determines a cognitive attribute of the cognitive system by generating a systematic pattern of the deviation of the adjusted forecast from an actual value of the parameter associated with the parameter forecast and determines a set of factors that are associated with the negative forecast bias or the positive forecast bias, wherein said set of factors is a combination of factors of an external factor group and a plurality of internal factor groups, (c) a forecast skill scoring module that generates a skill score of the cognitive system that corresponds to a skill factor group using a machine learning engine, wherein the skill factor group is a combination of an external factor group and a plurality of internal factor groups and (d) a forecast adjustment recommendation module that generates a recommendation of improved adjusted forecast based on the cognitive attribute of the cognitive system and skill score of the cognitive system, wherein the improved adjusted forecast comprises an updated value of the adjusted forecast.

In an embodiment, a one or more non-transitory computer-readable storage mediums storing the one or more sequences of instructions, which when executed by the one or more processors, causes to perform method for determining cognitive attributes from an adjusted forecast to automatically recommend change to the adjusted forecast. The method includes the steps of (i) generating an action recommendation that recommends mitigating or leveraging from a parameter forecast to a client device (116) associated with a bias management service, wherein the parameter forecast is a forecast of future values of a parameter associated with a factor group of the bias management service, (ii) obtaining an adjusted forecast from the client device (116), wherein the adjusted forecast is a modification in the parameter forecast based on an adjustment made by a cognitive system in the parameter forecast, (iii) classifying the adjusted forecast as a negative forecast bias or a positive forecast bias based on a deviation of the adjusted forecast from an actual value of the parameter associated with forecast, characterized in that, (iv) automatically determining a cognitive attribute of the cognitive system by generating a systematic pattern of the deviation of the adjusted forecast from an actual value of the parameter associated with the parameter forecast, (v) determining a set of factors that are associated with the negative forecast bias or the positive forecast bias, wherein said set of factors is a combination of factors of an external factor group and a plurality of internal factor groups, characterized in that, (vi) generating a skill score of the cognitive system that corresponds to a skill factor group using a machine learning engine, wherein the skill factor group is a combination of an external factor group and a plurality of internal factor groups, and, (vii) generating a recommendation of improved adjusted forecast based on the cognitive attribute of the cognitive system and skill score of the cognitive system, wherein the improved adjusted forecast comprises an updated value of the adjusted forecast.

BRIEF DESCRIPTION OF THE DRAWINGS

The embodiments herein will be better understood from the following detailed description with reference to the drawings, in which:

FIGS. 7A-7B are flow diagrams that describe a method for determining cognitive attributes from an adjusted forecast to automatically recommend changes to the adjusted forecast, according to some embodiments herein.

DETAILED DESCRIPTION OF PREFERRED EMBODIMENTS

Figure 1:
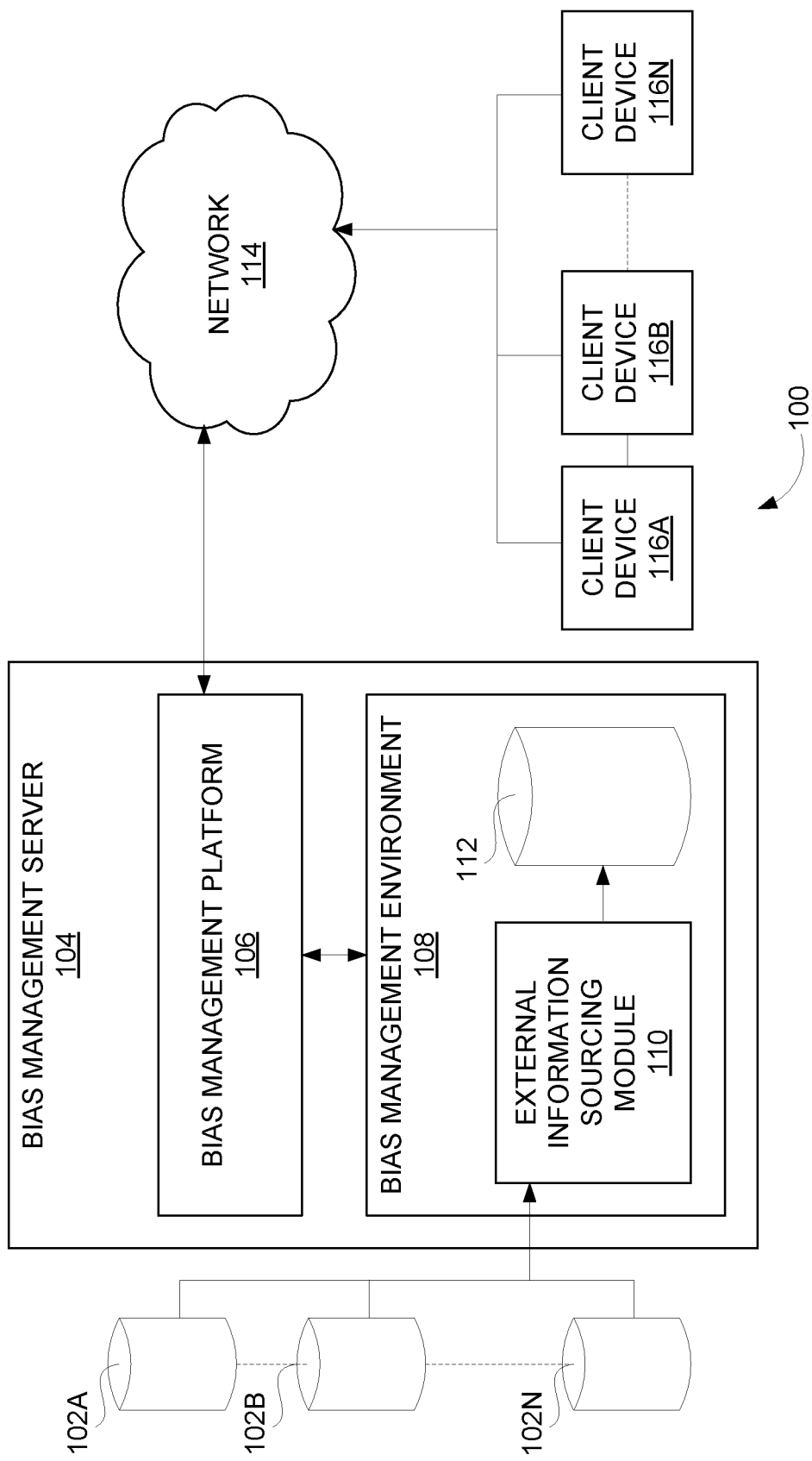
FIG. 1 is a block diagram that illustrates a cloud computing architecture that facilitates a bias management server as a cloud computing service to one or more client devices, according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

In the view of the foregoing, there is a need of a method for determining cognitive attributes from an adjusted forecast to automatically recommend change in the adjusted forecast. The embodiments herein achieve this by proposing a method for (a) receiving at a client device associated with a bias management service, an action recommendation to mitigate or leverage from a parameter forecast, wherein the parameter forecast is a forecast of future values of a parameter associated with a factor group, (b) obtaining an adjusted forecast from the client device, wherein the adjusted forecast is a modification in the parameter forecast based on an adjustment made by the cognitive system in the parameter forecast, (c) classifying the adjusted forecast as a negative forecast bias or a positive forecast bias based on a deviation of the adjusted forecast from an actual value of a parameter associated with forecast to determine at least one bias of the cognitive system in a factor group associated with the forecast, (d) determining a set of factors that are associated with the at least one bias of the cognitive system, wherein said set of factors is a combination of factors of an external factor group and a plurality of internal factor groups, (e) generating a skill score of the cognitive system based on factor group of the bias management service using a machine learning engine, wherein the factor group used to generate the skill score is a combination of an external factor group and a plurality of internal factor groups, (f) generating a recommendation to change a value of the adjusted forecast based on the at least one bias of the cognitive system and skill score of the planner. The combination of the above methods is being referred to "bias management". Referring now to the drawings, and more particularly to FIGS. 1 through 8, where similar reference characters denote corresponding features in a consistent manner throughout the figures, there are shown preferred embodiments. A "use-case" in this specification is defined as an organization or enterprise that uses a bias management service. A "cognitive system" in this specification refers to a mental system comprising of interrelated items of assumptions, beliefs, ideas, and knowledge that an individual hold about anything concrete including a person, a group, an object, or, abstract thoughts, theory, information. The cognitive system may be of a planner. The planner may make adjustments in a forecast. In some embodiments, the cognitive attributes of the cognitive system may be referred to as "bias".

FIG. 1 is a block diagram that illustrates a cloud computing architecture that facilitates a bias management server 104 as a cloud computing service to one or more client devices 116A-N. The block diagram 100 includes one or more data sources 102A-N, a bias management server 104, a network 114 and one or more client devices 116A-N. The bias management server 104 includes of a bias management platform 106 and a bias management environment 108. The bias management environment 108 includes an external information sourcing module 110 and an external information database 112. The cloud computing service includes bias management resources residing within a bias management environment 108 and the bias management resources are managed by the bias management platform 106 to provide bias management as a cloud computing service (hereafter referred to as a bias management service) to the one or more client devices 116A-N. In some embodiments, the one or more client devices 116A-N and the bias management service are associated with a use-case, a meta-data model of which is specified by a client device 116. In one embodiment, the one or more client devices 116A-N includes but not limited to a mobile device, a smart phone, a personal digital assistant (PDA), a notebook, a Global Positioning System (GPS) device, or any network enabled device. In an embodiment, the one or more client devices 116A-N receive an action recommendation to mitigate or leverage based on a parameter forecast, wherein the parameter forecast is a forecast of future values of a parameter. In an embodiment, the parameter forecast may be at least one of a demand forecast, inventory forecast or production forecast. In some embodiments, the action recommendation may be received at the one or more client devices 116A-N from the bias management server 104. In an embodiment, the action recommendation may be received at the one or more client devices 116A-N from an external forecast system.

In some embodiments, the bias management server 104 is configured to receive data from one or more data sources 102A-N which is processed by the external information sourcing module 110 and stored in the external information database 112. In an embodiment, the external information sourcing module 110 may process by aggregating the data obtained from one or more data sources 102A-N and storing them in the external information database 112 in a consolidated manner. The external information database 112 includes information which remains same for a one or more bias management services. The bias management platform 106 is communicatively connected to the bias management environment 108 to provide the bias management service to the one or more client devices 116A-N through a network 114. In some embodiments, the network 104 is a wired network, a wireless network, or a combination of a wired network a wireless network. In some embodiments, the network 104 is the Internet.

In some embodiments, the external information database 112 includes data obtained from the one or more external sources 102A-N that includes weather data, temperature, humidity, a competition data, an industry data, one or more consumer indices or macro-economic indices like Gross Domestic Product (GDP), an inflation metric or employment rate, etc. In some embodiments, the external information database 112 may include demographics data that includes income data of residents, population, etc. In an embodiment, data stored in the external information database 112 is used to train one or more machine learning models utilized later in the specification.

In an embodiment, the bias management server 104 may include a plurality of weather sensors that provide weather information for determining a deviation of the parameter from the actual value of the parameter.

Figure 2:
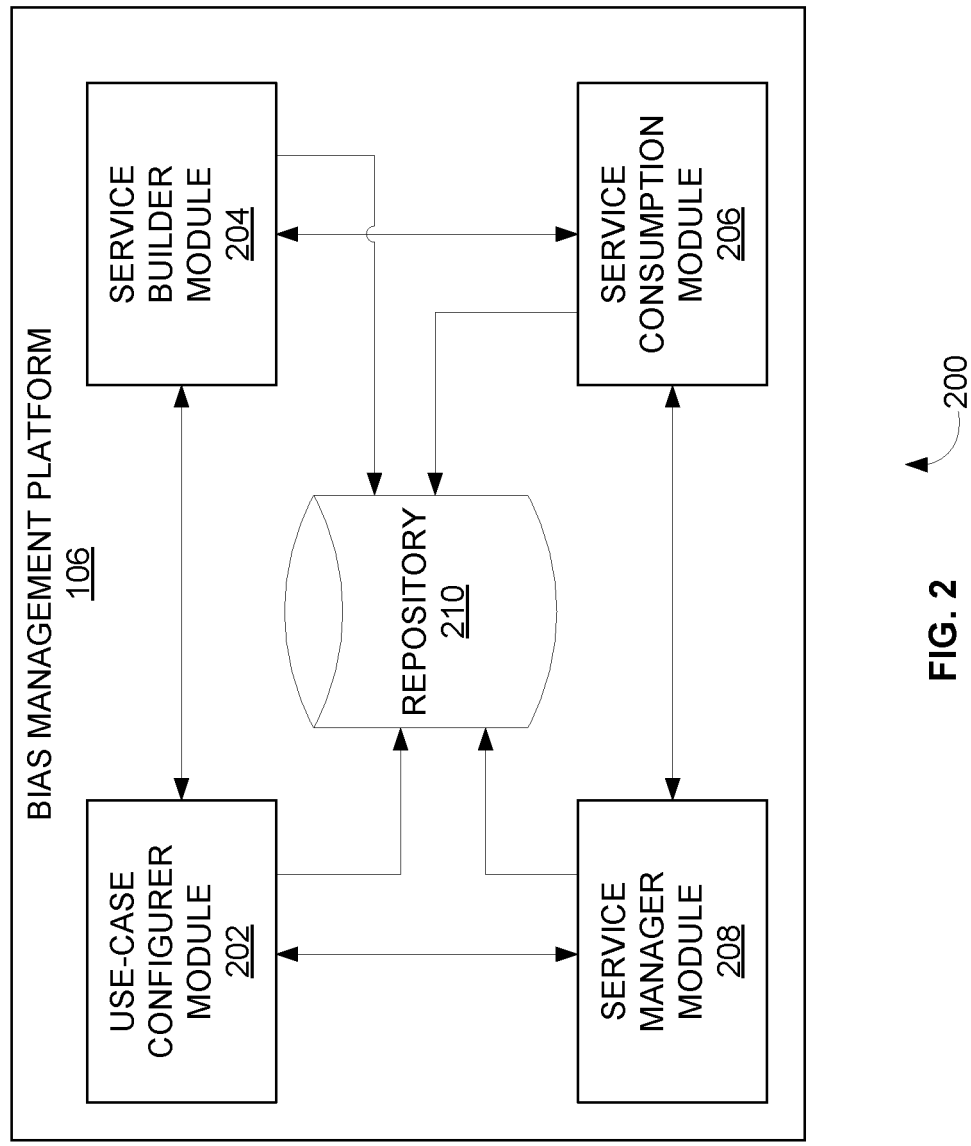
FIG. 2 is a block diagram of the bias management platform of FIG. 1, according to some embodiments herein.

FIG. 2 is a block diagram 200 of the bias management platform 106 of FIG. 1, according to some embodiments herein. The bias management platform 106 includes a use-case configurer module 202, a service builder module 204, a service consumption module 206, a service manager module 208 and a repository 210. In some embodiments, the service consumption module 206 is connected to the network 114 in order to facilitate the usage of the bias management service to the one or more client devices 116A-N.

The use-case configurer module 202 captures a specification information of a use-case for which the bias management service to be performed. In some embodiments, the specification information includes internal data of the use-case and the meta-data model of metrics which are applicable for the use-case. In some embodiments, the use-case configurer module 202 enables the one or more client devices 116A-N to select metrics of interest and models other bias management services available in the bias management server 104 to determine the infrastructure of the bias management environment 108 which may be required or preferred. The use-case configurer module 202 captures one or more possible actions from the one or more client devices 116A-N and operational constraints of the use-case.

The service builder module 204 is configured to receive the specification information of the use-case from the use-case configure module 202. The builder module 204 may assemble, validate and publish the bias management service to the service consumption module 206 for consumption of the bias management service by the one or more client devices 116A-N associated with the service.

The service consumption module 206 is configured to allow the one or more client devices 116A-N to use the bias management service. The bias management service may be utilized by a one or more cognitive systems associated with the use-case. In some embodiments, the service consumption module 206 may allow a user to request an update in the specification information of the use-case. The service manager module 208 manages the bias management service by communicating with the bias management environment 108.

Figure 3:
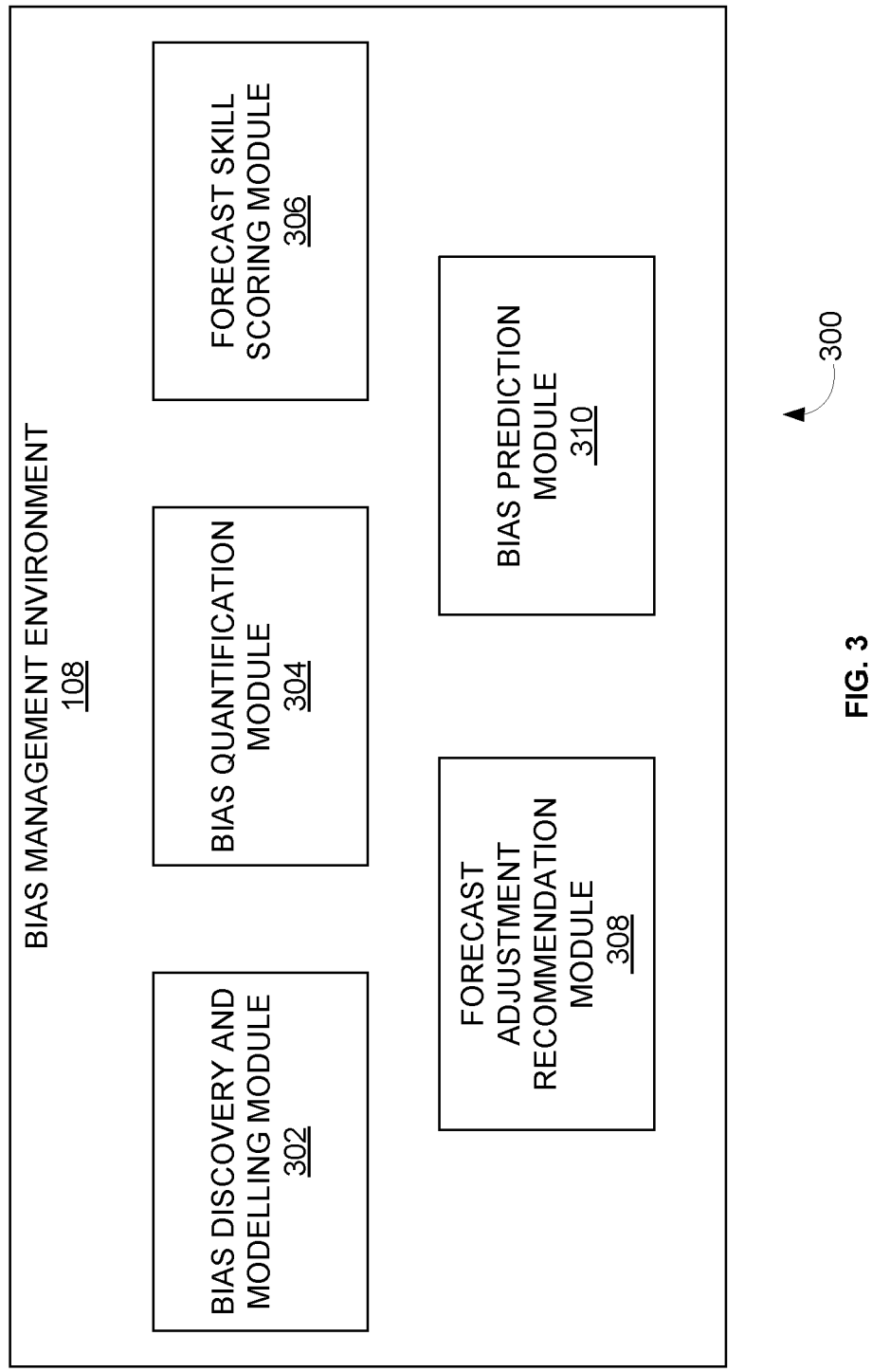
FIG. 3 is a block diagram of the bias management environment of FIG. 1, according to some embodiments herein.

FIG. 3 is a block diagram 300 of the bias management environment 108 of FIG. 1 according to some embodiments herein. The block diagram 300 is an exploded view of the bias management environment 108. The bias management environment 108 includes a bias discovery and modelling module 302, a bias quantification module 304, a forecast skill scoring module 306, a forecast adjustment recommendation module 308 and a bias prediction module 310.

The bias discovery and modelling module 302 classifies the adjusted forecast as a negative forecast bias or a positive forecast bias based on a deviation of the adjusted forecast from an actual value of the parameter associated with forecast. In an embodiment, the parameter can include, but not limiting to demand, inventory, production, materials, price, sales, revenue. There are consistent differences between actual parameters and previously generated forecasts of those parameters. The positive forecast bias happens when forecast accuracy of the adjusted forecast is increased from the parameter forecast and the negative forecast bias happens when the forecast accuracy of the adjusted forecast is decreased from the parameter forecast. In some embodiments, the parameter forecast may be received from an external forecasting system. In an embodiment, the bias discovery and modelling module 302 may include a machine learning engine. The machine learning engine may utilize data from the repository 210 which may include historical data of forecasts, actual value of the parameter, cognitive system adjustments and internal and external factors. In some embodiments, the machine learning engine may include the one or more machine learning models. In an embodiment, the one or more machine learning models are interconnected with each other. The models are connected with each other in such a manner that the output of a first machine learning model becomes a feature for a second machine learning model. In an embodiment, the one or more machine learning models may include, but not limited to, advanced algorithms including but not limited to SVR, XGBoost, Random Forests, Prophet, DeepAR, LSTM/RNNs, Generative Adversarial Networks, Convolutional Neural Networks, Quantile Regressions, Bayesian Regressions, Factorization Machines, Bayesian Structural Time Series Models, Hidden Markov Models and Monte Carlo Markov Chains.

The bias quantification module 304 automatically determines a cognitive attribute of the cognitive system by generating a systematic pattern of the deviation of the adjusted forecast from an actual value of the parameter associated with the parameter forecast and determines a set of factors that are associated with the negative forecast bias or the positive forecast bias, wherein said set of factors is a combination of factors of an external factor group and a plurality of internal factor groups. In an embodiment, determining the one or more bias of the cognitive system includes a tracking signal, where the tracking signal detects trends in the forecast adjustment of the cognitive system. In an embodiment, determining the one or more bias of the cognitive system includes identifying at least one human attribute of the cognitive system, wherein the at least one attribute includes age, gender or a location of the cognitive system. In an embodiment, the determined cognitive attributes may include cognitive biases. In some embodiments, cognitive biases may include but not limiting to anchoring bias, availability bias, over optimism bias, over-reaction to extreme events bias.

The bias discovery and modelling module 302 and the bias quantification module 304 may be implemented as a standalone predictive model that interfaces with a digital platform or other systems. It should also be noted that in this embodiment, the bias management server 104 implements the bias discovery and modelling module 302 and the bias quantification module 304, but one or more of applications may also implement either the bias discovery and modelling module 302 and the bias quantification module 304 that may work in connection with, or independently from the functionality of the bias management environment 108 as depicted on the bias management server 104.

The forecast skill scoring module 306 generates a skill score of the cognitive system that corresponds to a skill factor group using a machine learning engine, wherein the skill factor group is a combination of an external factor group and a plurality of internal factor groups. In some embodiments, the internal factor groups may include a first factor group that comprises at least one of a location of consumer, a retail store, a product, a price-pack of product, a placement of product, a range, a visibility, a coverage, a frequency, a distribution reach, a channel, an event type or an inventive, a second factor group that comprises at least one of a promotion channel, a location of a promotion activity, a product for promotion, a time period (calendar) for a promotion activity, a promotion type, a price for a promotion activity, a discount for a promotion activity or a creative for a promotion activity and a third factor group that comprises at least one of a location of inventory, a store of inventory, a type of inventory, a source location of inventory, a transfer of inventory, a new quantity for the inventory, a safety stock of inventory for a product, on hand levels of inventory or a reorder quantity of inventory, an allocation quantity of inventory.

In some embodiments, forecast skill scoring module 306 may utilize the machine learning engine. The machine learning engine may comprise one or more machine learning models or a machine learning model based on a tracking signal. The tracking signal detects trends in the forecast adjustment of the planner. In an embodiment, the machine learning engine may utilize data from the repository 210 for training one or more machine learning models. In some embodiments, the machine learning engine may include the one or more machine learning models. In an embodiment, the one or more machine learning models are interconnected with each other. The models are connected with each other in such a manner that the output of a first machine learning model becomes a feature for a second machine learning model. In an embodiment, the one or more machine learning models may include advanced algorithms including but not limited to SVR, XGBoost, Random Forests, Prophet, DeepAR, LSTM/RNNs, Generative Adversarial Networks, Convolutional Neural Networks, Quantile Regressions, Bayesian Regressions, Factorization Machines, Bayesian Structural Time Series Models, Hidden Markov Models and Monte Carlo Markov Chains.

In some embodiments, one or more human cognitive systems may have different skills that impact the forecast adjustment made by the one or more cognitive systems. Some cognitive systems will be better than other cognitive systems in terms of accuracy of the adjusted forecast with respect to actual value of the parameter. In an embodiment, the skill score is predicted for one or more human cognitive systems in terms of a frequency of negative forecast bias and positive forecast bias using the machine learning engine. In an embodiment, the one or more cognitive systems may be segregated based on a combination of at least one of the skill score of the cognitive system and the at least one bias of the cognitive system.

The forecast adjustment recommendation module 308 generates a recommendation of improved adjusted forecast based on the cognitive attribute of the cognitive system and skill score of the cognitive system, wherein the improved adjusted forecast comprises an updated value of the adjusted forecast.

The bias prediction module 310 predicts a future adjusted forecast based on the skill score and the bias of the cognitive system in the factor group. In an embodiment, the bias prediction module 310 predicts a forecast adjustment that a cognitive system will do to a parameter forecast under different conditions and also as a function of the individual characteristics of the cognitive system.

In an embodiment, the bias management environment 108 may include a machine learning based forecasting engine that continuously learns from forecast error scenarios by automatically addressed the required changes to the machine learning based forecasting engine.

Figure 4:
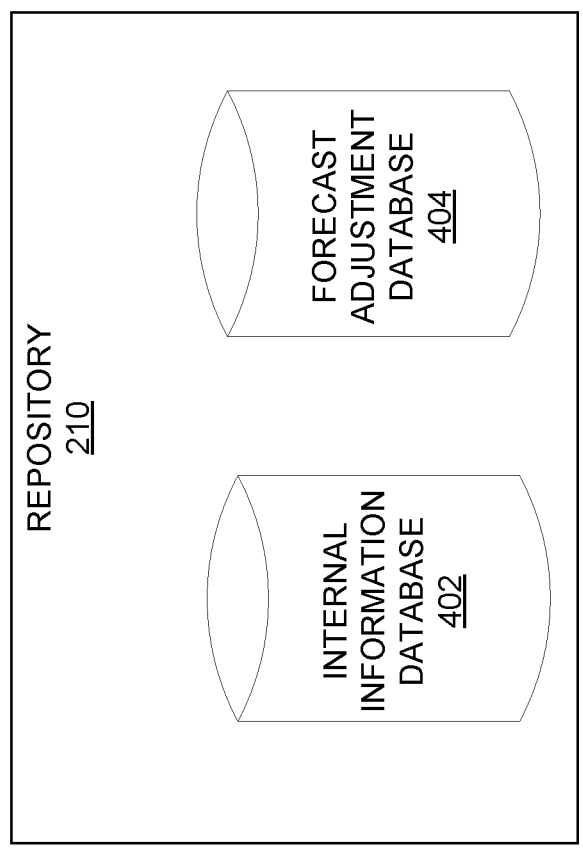
FIG. 4 is a block diagram of a repository of FIG. 2 according to some embodiments herein.

FIG. 4 is a block diagram of the repository 210 of FIG. 2 according to some embodiments herein. The repository 210 includes an internal information database 402 and a forecast adjustment database 404. The internal information database 402 includes the data which is internal to the use-case that has been specified earlier. In some embodiments, the internal information database 402 may include operation data of the use-case. The operation data of the use-case may include sales operations, customer and product data, channels data, distribution and location, orders, inventory operations, production operations, POS or sales, promotions and marketing events which is specific to the use-case.

In some embodiments, the internal information database 402 includes planning data of the user case. The planning data of the use-case may include sales plans and forecasts, financial plans and forecasts, price plans, marketing plans, promotion plans, demand plans, inventory plans, production plans.

The forecast adjustment database 404 stores forecast adjustments which are made by a cognitive system on the parameter forecast. In an embodiment, the forecast adjustment database 404 may include human organization decisions and forecast corrections that are collected from various sources within the organization. In an embodiment, the repository 210 may include a one or more forecast metrics associated for a parameter. The one or more forecast metrics may include, but not limiting to, a percentage by which the adjusted forecast includes an error, whether the adjusted forecast has been consistently in error over several consecutive periods, and whether a magnitude of the adjusted forecast error is seen over time and is sufficient to warrant immediate attention for the product with which the adjusted forecast is associated. They are actionable in that they allow the bias quantification module 304 to detect the possible causes of forecast error.

In some embodiments, the internal information database 402 may include operation data of the use-case. The operation data of the use-case may include sales operations, customer and product data, channels data, distribution and location, orders, inventory operations, production operations, POS or sales, promotions and marketing events which is specific to the use-case. In some embodiment, the internal information database 402 may include customer and sales transactions, supplier data, sales history and plan, financial history and plan, order history and plan, inventory history and plan, shipments history and plan, product data, customer data, channel data, transportation data.

Figure 5:
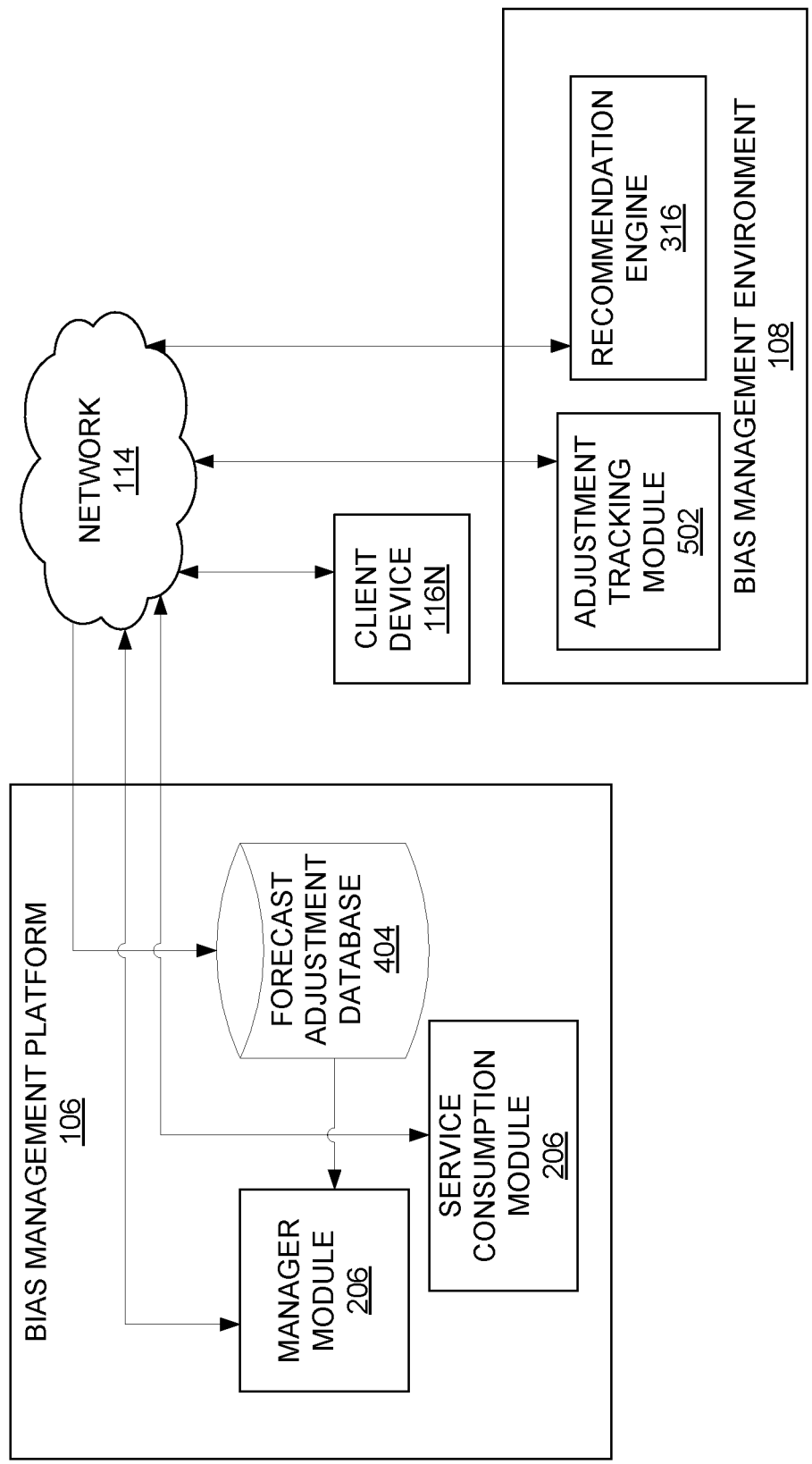
FIG. 5 is a block diagram that illustrates a distributed computing architecture that collectively provides bias management service to one or more client devices, according to some embodiments herein.

FIG. 5 is a block diagram that illustrates a distributed computing architecture that collectively provides bias management service to one or more client devices, according to some embodiments herein. In some embodiments, the bias management platform 106 and the bias management environment may run on separate systems to facilitate the bias management service to one or more client devices. This bias management environment 108 may include an adjustment tracking module 502 that tracks an adjustment made by a cognitive system in the parameter forecast in the use-case from the client device 116A-N. The adjustment may be captured from the client device 116N through the network 114. The forecast adjustment database 404 stores the adjustment made by the cognitive system in the use-case. In some embodiments, recorded adjustment in the use-case which is stored in the forecast adjustment database 404 is transmitted to the bias management environment 108 for enabling reinforcement learning of the advanced machine learning models in the bias management environment 108. The action tracking module may employ the advanced machine learning models for providing accurate predictions on the deviation of the metric of interest.

In some embodiments, the recommendation engine 316 transmits accurate predictions to the service consumption module 206. The service consumption module 206 communicates improved recommendations to the client device 116(A-N) through the network 114.

Figure 6:
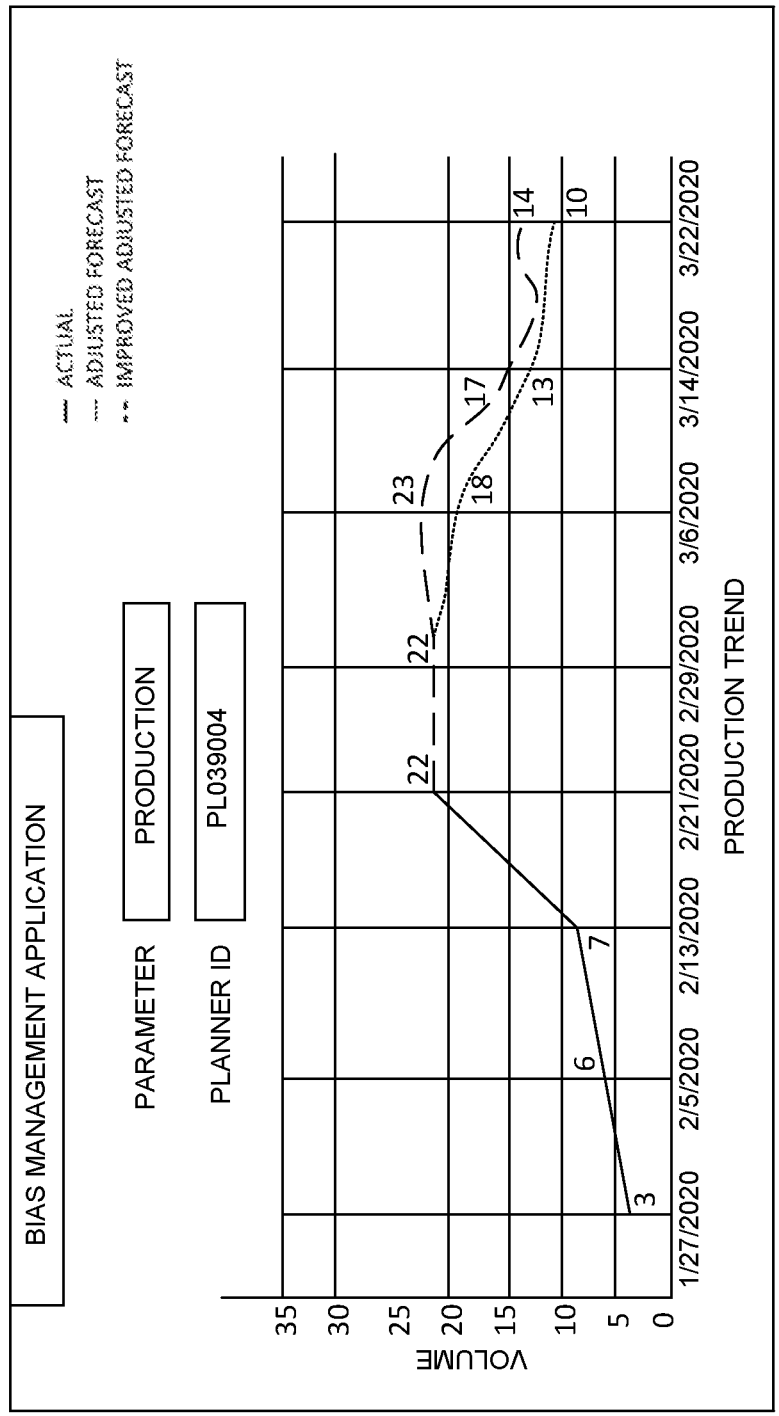
FIG. 6 is an illustration that depicts a recommendation of improved adjusted forecast based on a cognitive attribute of a cognitive system.

FIG. 6 is an illustration that depicts a recommendation of improved adjusted forecast based on a cognitive attribute of a cognitive system. In an exemplary embodiment, the graph herein illustrates an actual value of a production trend of the use-case through a solid line. A dotted line in the illustration depicts an adjusted forecast, where the adjusted forecast is an adjustment in the parameter forecast made using the cognitive system. A dashed line in the illustration depicts an improved adjusted forecast, where the improved adjusted forecast is an improved adjusted forecast based on the cognitive attribute of the cognitive system and skill score of the cognitive system, wherein the improved adjusted forecast comprises an updated value of the adjusted forecast.

In some embodiments, the illustration of FIG. 6 is transmitted and displayed on the client device 116N for a user to improve the forecast adjustment of the user. A user using the client device 116A-N interprets this information. In an embodiment, the user takes an action in the use-case on the interpretation of this information and the adjustment tracking module 318 tracks the adjustment in the use-case from the client device 116A-N. The adjustment may be captured from the client device 116N through the network 114.

Figure 7B:
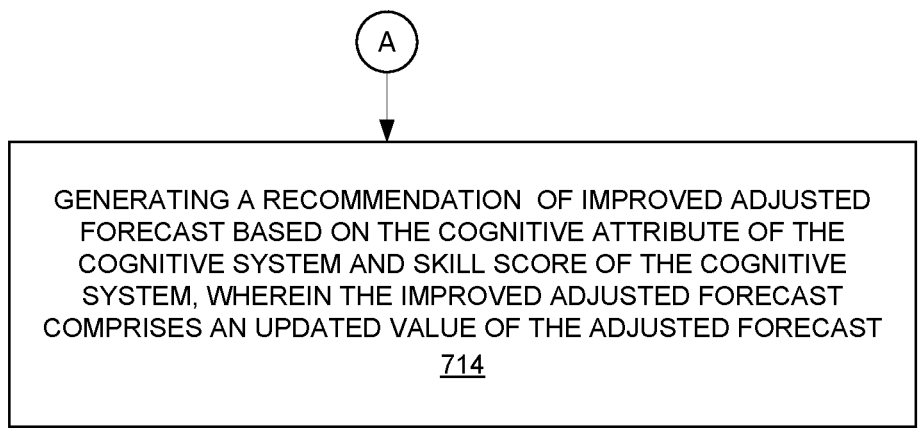

FIGS. 7A-7B are flow diagrams that describe a method for determining cognitive attributes from an adjusted forecast to automatically recommend changes to the adjusted forecast, according to some embodiments herein. At step 702, generating an action recommendation that recommends mitigating or leveraging from a parameter forecast to a client device (116) associated with a bias management service, wherein the parameter forecast is a forecast of future values of a parameter associated with a factor group of the bias management service. At step 704, obtaining an adjusted forecast from the client device (116), wherein the adjusted forecast is a modification in the parameter forecast based on an adjustment made by a cognitive system in the parameter forecast. At step 706, classifying the adjusted forecast as a negative forecast bias or a positive forecast bias based on a deviation of the adjusted forecast from an actual value of the parameter associated with forecast, characterized in that. At step 708, automatically determining a cognitive attribute of the cognitive system by generating a systematic pattern of the deviation of the adjusted forecast from an actual value of the parameter associated with the parameter forecast. At step 710, determining a set of factors that are associated with the negative forecast bias or the positive forecast bias, wherein said set of factors is a combination of factors of an external factor group and a plurality of internal factor groups. Characterized in that, at step 712, generating a skill score of the cognitive system that corresponds to a skill factor group using a machine learning engine, wherein the skill factor group is a combination of an external factor group and a plurality of internal factor groups. At step 714, generating a recommendation of improved adjusted forecast based on the cognitive attribute of the cognitive system and skill score of the cognitive system, wherein the improved adjusted forecast comprises an updated value of the adjusted forecast.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
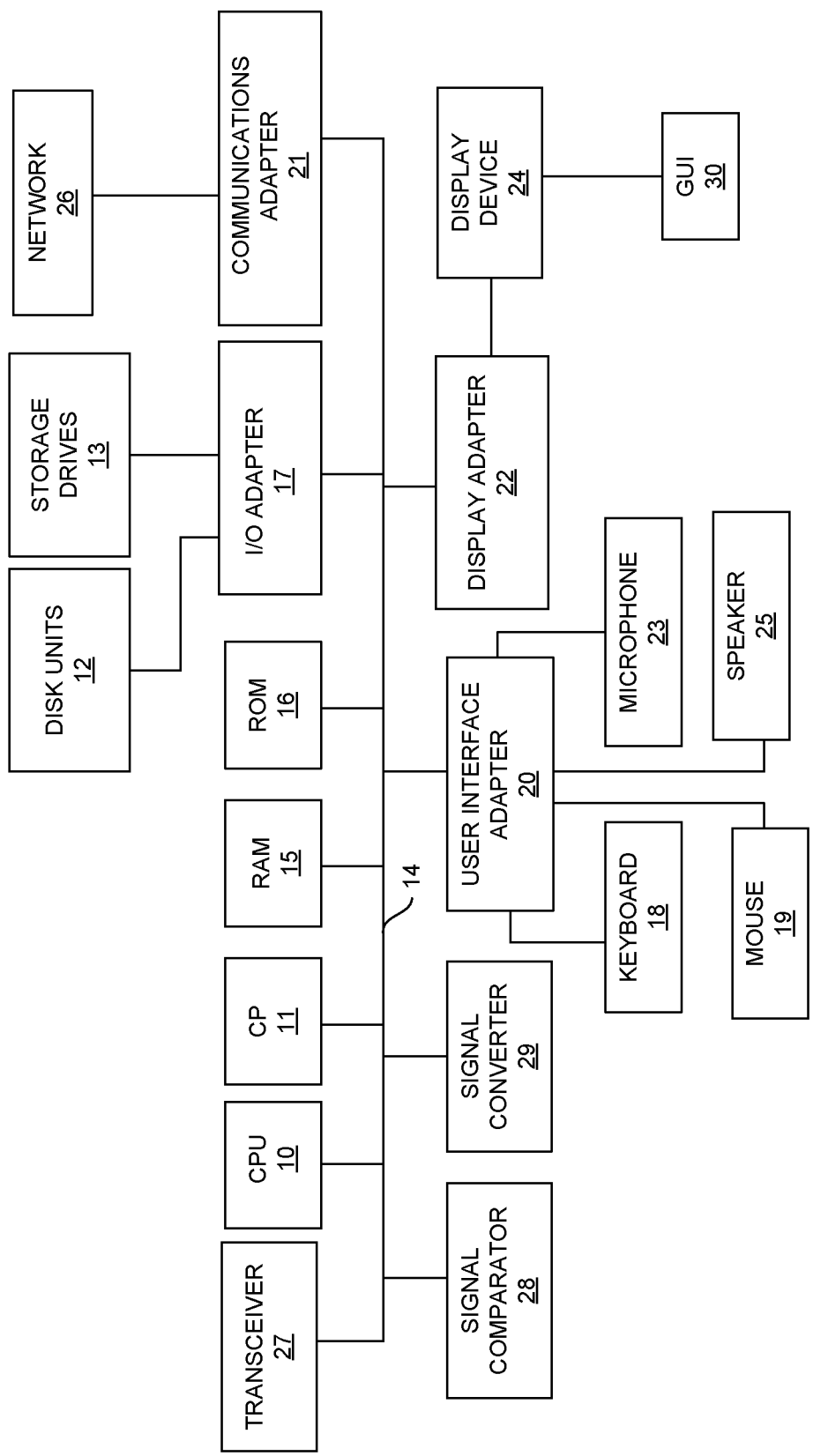
FIG. 8 is a schematic diagram of a client device or a bias management server that is configured to perform any one or more of the methodologies herein, in accordance with the embodiments herein.

A representative hardware environment for practicing the embodiments herein is depicted in FIG. 8, with reference to FIGS. 1 through 7B. This schematic drawing illustrates a hardware configuration of a server/computer system/user device in accordance with the embodiments herein. The user device includes at least one processing device 10 and a cryptographic processor 11. The special-purpose CPU 10 and the cryptographic processor (CP) 11 may be interconnected via system bus 14 to various devices such as a random access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The user device can read the inventive instructions on the program storage devices and follow these instructions to execute the methodology of the embodiments herein. The user device further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

I claim:

1. A method for determining cognitive attributes from an adjusted forecast to automatically recommend an improved adjusted forecast, the method comprising:
   generating an action recommendation that recommends mitigating or leveraging from a parameter forecast to a client device associated with a bias management service, wherein the parameter forecast is a forecast of future values of a parameter associated with a factor group of the bias management service;
   obtaining an adjusted forecast from the client device, wherein the adjusted forecast is a modification in the parameter forecast based on an adjustment made by a cognitive system in the parameter forecast;
   using a bias discovery and modelling module in a bias management server, classifying the adjusted forecast as a negative forecast bias or a positive forecast bias based on a deviation of the adjusted forecast from an actual value of the parameter associated with forecast;
   using a bias quantification module in the bias management server, automatically determining a cognitive attribute of the cognitive system by generating a systematic pattern of the deviation of the adjusted forecast from an actual value of the parameter associated with the parameter forecast;
   using the bias quantification module, determining a set of factors that are associated with the negative forecast bias or the positive forecast bias, wherein said set of factors is a combination of factors of an external factor group and a plurality of internal factor groups;
   using a forecast skill scoring module in the bias management server, generating a skill score of the cognitive system that corresponds to a skill factor group using a machine learning engine, the machine learning engine comprising a machine learning model based on a tracking signal that detects trends in a forecast adjustment utilizing data from a repository, wherein the skill factor group is a combination of an external factor group and a plurality of internal factor groups; and
   using a forecast adjustment recommendation module in the bias management server, generating a recommendation of improved adjusted forecast based on the cognitive attribute of the cognitive system and skill score of the cognitive system, wherein the improved adjusted forecast comprises an updated value of the adjusted forecast,
   wherein the bias management server further comprises a bias management platform and a bias management environment, the bias management platform communicatively connected to the bias management environment to provide the bias management service to the client device through a network, the bias management environment including a machine learning based forecasting engine that continuously learns from forecast error scenarios by automatically addressing required changes to the machine learning based forecasting engine, the bias management platform comprising:
   a use-case configurer module that captures a specification information of a use-case for the bias management service to be performed, the specification information including internal data of the use-case and a meta-data model of metrics which are applicable for the use-case, wherein the use-case configurer module enables the client device to select metrics of interest and models of other bias management services available in the bias management server to determine infrastructure of the bias management environment which may be required;
   a service builder module configured to receive the specification information of the use-case from the use-case configurer module and assemble, validate and publish the bias management service to the service consumption module for consumption of the bias management service by the client device associated with the service;
   a service consumption module connected to network to facilitate usage of the bias management service to the client device, wherein the service consumption module receives the bias management service published by the service builder module to be consumed by the client device;
   a service manager module that manages the bias management service by communicating with the bias management environment; and
   the repository that includes historical data of forecasts, actual value of the parameter, cognitive system adjustments, and data from the use-case configurer module, the service builder module, the service consumption module, and the service manager module.

2. The method as claimed in claim 1, wherein the plurality of internal factor groups comprises:
   a first factor group that comprises at least one of a location of consumer, a retail store, a product, a price-pack of product, a placement of product, a range, a visibility, a coverage, a frequency, a distribution reach, a channel, an event type or an inventive;
   a second factor group that comprises at least one of a promotion channel, a location of a promotion activity, a product for promotion, a time period (calendar) for a promotion activity, a promotion type, a price for a promotion activity, a discount for a promotion activity or a creative for a promotion activity; and
   a third factor group that comprises at least one of a location of inventory, a store of inventory, a type of inventory, a source location of inventory, a transfer of inventory, a new quantity for the inventory, a safety stock of inventory for a product, on hand levels of inventory or a reorder quantity of inventory, an allocation quantity of inventory.

3. The method as claimed in claim 1, wherein
   positive forecast bias happens when forecast accuracy of the adjusted forecast is increased from the parameter forecast; and
   negative forecast bias happens when the forecast accuracy of the adjusted forecast is decreased from the parameter forecast.

4. The method of claim 1, wherein the method includes segregating one or more cognitive systems based on a combination of at least one of the skill score of the cognitive system and the at least one bias of the cognitive system.

5. The method as claimed in claim 1, wherein the method includes predicting a skill score of different cognitive systems in terms of a frequency of negative forecast bias and positive forecast bias.

6. The method of claim 5, wherein the method includes predicting a future adjusted forecast based on the skill score and the bias of the cognitive system in the factor group.

7. The method as claimed in claim 1, wherein the method of determining the at least one bias of the cognitive system includes:
identifying at least one human attribute of the cognitive system, wherein the at least one attribute includes age, gender or a location of the cognitive system.

8. The method as claimed in claim 1, wherein the parameter forecast is done at different levels, wherein the levels include product level, a location level, a stock keeping unit level.

9. A system of determining cognitive attributes from an adjusted forecast to automatically recommend change to the adjusted forecast, the system comprising:
a client device associated with a bias management service that receives an action recommendation that recommends mitigating or leveraging from a parameter forecast, wherein the parameter forecast is a forecast of future values of a parameter associated with a factor group of the bias management service and records an adjusted forecast, wherein the adjusted forecast is a modification in the parameter forecast based on an adjustment made by a cognitive system in the parameter forecast;
a bias management server comprising a bias management platform and a bias management environment, the bias management platform communicatively connected to the bias management environment to provide the bias management service to the client device through a network, the bias management environment including a machine learning based forecasting engine that continuously learns from forecast error scenarios by automatically addressing required changes to the machine learning based forecasting engine, the bias management platform comprising:
a use-case configurer module that captures a specification information of a use-case for the bias management service to be performed, the specification information including internal data of the use-case and a meta-data model of metrics which are applicable for the use-case, wherein the use-case configurer module enables the client device to select metrics of interest and models of other bias management services available in the bias management server to determine infrastructure of the bias management environment which may be required;
a service builder module configured to receive the specification information of the use-case from the use-case configurer module and assemble, validate and publish the bias management service to the service consumption module for consumption of the bias management service by the client device associated with the bias management service;
a service consumption module connected to network to facilitate usage of the bias management service to the client device, wherein the service consumption module receives the bias management service published by the service builder module to be consumed by the client device;
a service manager module that manages the bias management service by communicating with the bias management environment; and
a repository that includes historical data of forecasts, actual value of the parameter, cognitive system adjustments, and data from the use-case configurer module, the service builder module, the service consumption module, and the service manager module,
the bias management environment further comprising:
a bias discovery and modelling module that classifies the adjusted forecast as a negative forecast bias or a positive forecast bias based on a deviation of the adjusted forecast from an actual value of the parameter associated with forecast;
a bias quantification module that automatically determines a cognitive attribute of the cognitive system by generating a systematic pattern of the deviation of the adjusted forecast from an actual value of the parameter associated with the parameter forecast and determines a set of factors that are associated with the negative forecast bias or the positive forecast bias, wherein said set of factors is a combination of factors of an external factor group and a plurality of internal factor groups;
a forecast skill scoring module that generates a skill score of the cognitive system that corresponds to a skill factor group using a machine learning engine that utilizes data from the repository to train one or more machine learning models, the machine learning engine comprising a machine learning model based on a tracking signal that detects trends in a forecast adjustment utilizing data from a repository, wherein the skill factor group is a combination of an external factor group and a plurality of internal factor groups;
a forecast adjustment recommendation module that generates a recommendation of improved adjusted forecast based on the cognitive attribute of the cognitive system and skill score of the cognitive system, wherein the improved adjusted forecast comprises an updated value of the adjusted forecast; and
a bias prediction module that predicts the future adjusted forecast based on the skill score and the bias of the cognitive system in the fact group, wherein the bias prediction module predicts a forecast adjustment that the cognitive system will do to the parameter forecast as a function of individual characteristics of the cognitive system.

10. A one or more non-transitory computer-readable storage mediums storing the one or more sequences of instructions, which when executed by the one or more processors, causes to perform method for determining cognitive attributes from an adjusted forecast to automatically recommend change to the adjusted forecast, wherein the method comprises:
generating an action recommendation that recommends mitigating or leveraging from a parameter forecast to a client device associated with a bias management service, wherein the parameter forecast is a forecast of future values of a parameter associated with a factor group of the bias management service;
obtaining an adjusted forecast from the client device, wherein the adjusted forecast is a modification in the parameter forecast based on an adjustment made by a cognitive system in the parameter forecast;
using a bias discovery and modelling module in a bias management server, classifying the adjusted forecast as a negative forecast bias or a positive forecast bias based on a deviation of the adjusted forecast from an actual value of the parameter associated with forecast;
using a bias quantification module in the bias management server, automatically determining a cognitive attribute of the cognitive system by generating a systematic pattern of the deviation of the adjusted forecast from an actual value of the parameter associated with the parameter forecast;

using the bias quantification module, determining a set of factors that are associated with the negative forecast bias or the positive forecast bias, wherein said set of factors is a combination of factors of an external factor group and a plurality of internal factor groups;

using a forecast skill scoring module in the bias management server, generating a skill score of the cognitive system that corresponds to a skill factor group using a machine learning engine, wherein the skill factor group is a combination of an external factor group and a plurality of internal factor groups, the machine learning engine comprising a machine learning model based on a tracking signal that detects trends in a forecast adjustment utilizing data from a repository; and using a forecast adjustment recommendation module in the bias management server, generating a recommendation of improved adjusted forecast based on the cognitive attribute of the cognitive system and skill score of the cognitive system, wherein the improved adjusted forecast comprises an updated value of the adjusted forecast, wherein the bias management server comprises a bias management platform and a bias management environment, the bias management platform communicatively connected to the bias management environment to provide the bias management service to the client device through a network, the bias management environment including a machine learning based forecasting engine that continuously learns from forecast error scenarios by automatically addressing required changes to the machine learning based forecasting engine, the bias management platform comprising:

a use-case configurer module that captures a specification information of a use-case for the bias management service to be performed, the specification information including internal data of the use-case and a meta-data model of metrics which are applicable for the use-case, wherein the use-case configurer module enables the client device to select metrics of interest and models of other bias management services available in the bias management server to determine infrastructure of the bias management environment which may be required;

a service builder module configured to receive the specification information of the use- case from the use-case configurer module and assemble, validate and publish the bias management service to the service consumption module for consumption of the bias management service by the client device associated with the bias management service;

a service consumption module connected to network to facilitate usage of the bias management service to the client device, wherein the service consumption module receives the bias management service published by the service builder module to be consumed by the client device;

a service manager module that manages the bias management service by communicating with the bias management environment; and the repository that includes historical data of forecasts, actual value of the parameter, cognitive system adjustments, and data from the use-case configurer module, the service builder module, the service consumption module, and the service manager module.

* * * * *